Patented Nov. 30, 1926.

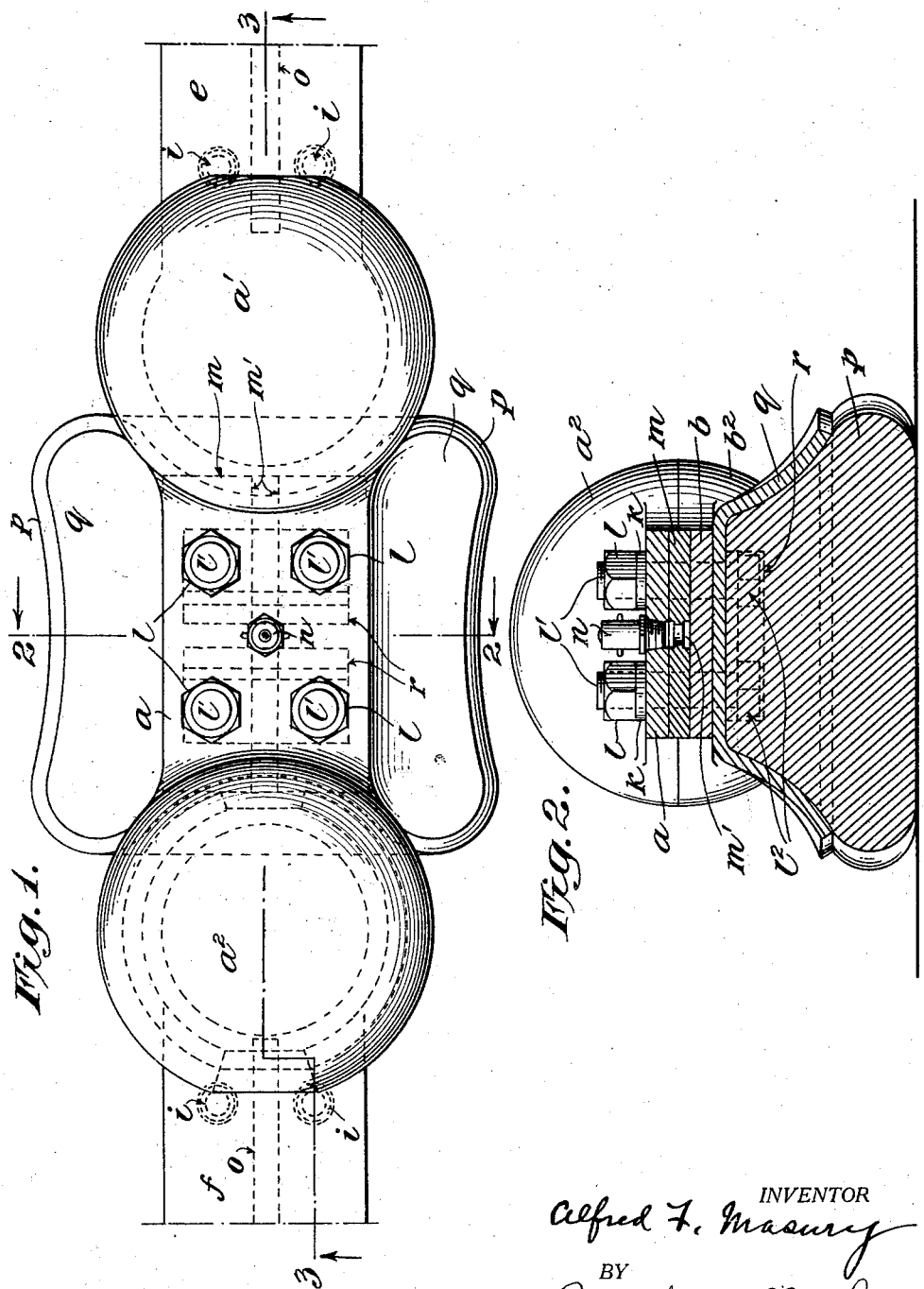

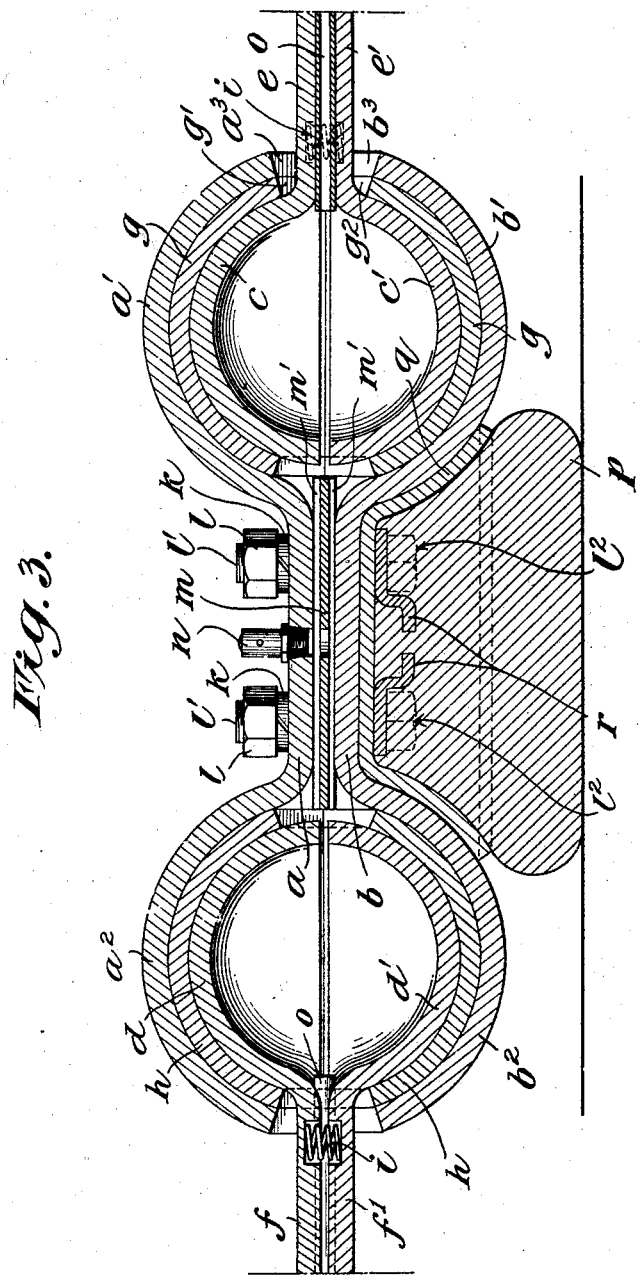

1,608,517

UNITED STATES PATENT OFFICE.

ALFRED F. MASURY, OF NEW YORK, N. Y., ASSIGNOR TO INTERNATIONAL MOTOR COMPANY, OF NEW YORK, N. Y., A CORPORATION OF DELAWARE.

TRACK FOR TRACKLAYING MACHINES.

Application filed April 4, 1923. Serial No. 629,795.

In so-called track laying machines the life of the track is very definitely limited and it has to be replaced with comparative frequency. The strains to which such tracks are subjected require them to be made very strong and the constant action between adjacent links affords a problem of wear and lubrication which has never been solved satisfactorily. The principal object of the present invention is to provide a track which is composed of links which are so constructed and interconnected as to be susceptible of very light construction and somewhat yielding to absorb and eliminate to a great extent the sudden strains to which they are subjected and in which adequate lubrication may be effectively provided at all times especially with reference to the principal bearing surfaces which in the improved construction are made of comparatively great superficial area.

A further object of the invention is to provide links which may be stamped out and be readily assembled and united in proper relation to the bearing surfaces on which the principal action falls and, similarly, disassembled when necessary for replacement. A further object of the invention is to provide a track construction which shall be very flexible and lend itself to changes of direction and changes of speed with the utmost facility.

Other objects and advantages of the invention will appear in connection with the description of the embodiment illustrated in the accompanying drawings, wherein:

Figure 1 is a view in plan indicating a section of track and showing three interconnected links.

Figure 2 is a view in transverse section therethrough taken on the plane indicated by the line 2—2 of Figure 1 and looking in the direction of the arrows.

Figure 3 is a view in longitudinal section taken on the planes indicated by the lines 3—3 of Figure 1 and looking in the direction of the arrows.

The improved track, generally speaking, is made up of a series of links which are so articulated as to afford universal movement therebetween. These links carry suitable tread members which engage the ground although the invention is not limited to the character of the tread member except in so far as concerns the specific means illustrated for securing it to each link. Accordingly, reference is first to be had to Figure 3 for an understanding of the details of the construction of the links and their relation when assembled. Each alternate link includes two complementary sections $a$, $b$, stamped out and formed with opposed hemispherical sockets $a'$, $a^2$, and $b'$, $b^2$, respectively, at the opposite ends. Within the spherical sockets thus formed rest, respectively, the hemispherical ends $c$, $c'$, and $d$, $d'$, of complementary sections of adjacent link members $e$, $e'$, and $f$, $f'$. Interposed between the spherical ends formed by the opposed sections $c$, $c'$, and $d$, $d'$, and the spherical sockets in the female link member formed by the sections $a'$, $b'$ and $a^2$, $b^2$, respectively, are disposed spherical bearing members $g$, $h$, respectively. These bearing members are of such radius as to conform to the curvature of the concave sockets in which they rest and, interiorly, to the convex ends which rest therein. For the purposes of this description it will be sufficient to continue it only with reference to two engaged links. The meeting edges at one pole of the spherical sockets $a'$, $b'$, are slotted as indicated at $a^3$, $b^3$, to receive the link sections $e$, $e'$ and the spherical bearing member $g$ is similarly slotted along the same line in its upper and lower halves as indicated at $g'$, $g^2$. The sections $e$, $e'$ are separated yieldingly by springs $i$ which press the hemispherical ends $c$, $c'$ within the bearing member $g$ while the spherical socket portions $a'$, $b'$, are constantly pressed yieldingly onto the exterior of the said spherical bearing $g$ by spring washers $k$ operatively engaged with the retaining nuts $l$ and bolts $l'$ by means of which the link sections $a$, $b$, are united. The result of this relation of parts is to maintain the links yieldingly in engagement to the end that there may be some degree of flexibility to absorb or cushion sudden changes in speed or direction. Again, the construction insures relatively large superficial bearing area for the interconnected portions of the links and, incidentally, capacity for universal movement therebetween.

The means by which adequate and uniform oiling of all of the links is secured will now be described. Interposed between the link sections a, b, is a spacer plate m which has extending therethrough longitudinal oiling channels m' which communicate with the interior of the bearings g, h, and transmits lubricant to its inner and outer surfaces. An oil filling duct may be provided at n in communication with the channels m'. Alternate links have oil pipes or channels o extending longitudinally thereof and lying between the sections e, e', and f, f', respectively, and communicating with the interior of the spherical ends c, c', and d, d', respectively.

In assembling the parts it will be clear that with the sections e, e', in proper relation the bearing parts of the spherical bearing g may be fitted over the spherical ends c, c', and the confining sockets a', b', engage with the exterior surface thereof and the link sections a, b, united by means of through bolts l'. Since the elements described may be formed from stampings they may be light in weight and since they are united by yielding retaining devices such as the springs k and i which mutually interact, the union is such as to cushion the stresses to which the track is subjected, thereby increasing the life thereof materially. Again, the relatively large superficial bearing area afforded and the means for uniformly and continuously lubricating each of such bearings contributes to greater life and reliability for the track in use.

As indicated hereinbefore the invention is not limited to the character of the tread although as illustrated, the bolts l' which unite the link sections a, b, may serve the additional function of securing on the links the tread member p which may be of non-metallic yielding material such as rubber, or of any other approved construction. When the tread is of rubber it may be moulded in a cup-like seat q which also may receive angle pieces r engaged by the heads l² of the bolts l' and embedded in the rubber.

Changes in construction and the form and relation of the elements may be made without departing from the invention so long as the characteristic advantages thereof are retained in means which function in general accordance with the principles described.

What I claim is:

1. A track for track laying vehicles including links composed of stampings, alternate link sections having opposed semi-spherical ends and alternate links having semi-spherical sockets in their respective ends to embrace the said semi-spherical ends, means to expand the semi-spherical ends, and means to interlock the parts.

2. A track for track laying vehicles including sectional links formed of stampings, alternate links being formed with spherical ends and alternate links being formed with spherical sockets to engage said spherical ends, securing devices for the sections having the spherical sockets including spring means to afford flexibility, and springs to expand the spherical ends in said sockets.

3. A track for track laying vehicles including sectional links formed of stampings, alternate links being formed with spherical ends and alternate links being formed with spherical sockets to engage said spherical ends, securing devices for the sections having the spherical sockets including spring means to afford flexibility, springs to expand the spherical ends in said sockets, and a spherical bearing interposed operatively between said spherical ends and spherical sockets, respectively.

4. A track for track laying vehicles including sectional links formed of stampings, alternate links being formed with spherical ends and alternate links being formed with spherical sockets to engage said spherical ends, securing devices for the sections having the spherical sockets including spring means to afford flexibility, springs to expand the spherical ends in said sockets, and a spherical bearing interposed operatively between said spherical ends and spherical sockets, respectively, said links being formed with longitudinal through channels for a lubricant.

This specification signed this 31st day of March A. D. 1923.

ALFRED F. MASURY.